United States Patent [19]
Roll et al.

[11] 3,858,217
[45] Dec. 31, 1974

[54] LORAN ASSIST DEVICE

[75] Inventors: Ronald G. Roll, Silver Spring; Charles R. Edwards; Robert C. Moore, both of Laurel; George D. Wagner, Clarksville; Ronald K. Burek, Beltsville, all of Md.

[73] Assignee: The United States of America as represented by the Secretary of the Navy, Washington, D.C.

[22] Filed: Jan. 21, 1974

[21] Appl. No.: 435,080

[52] U.S. Cl.... 343/103 R, 235/150.272, 343/112 C
[51] Int. Cl. ............................................. G01s 1/20
[58] Field of Search .................. 343/103 R, 112 C; 235/150.272

[56] References Cited
UNITED STATES PATENTS
3,321,760  5/1967  Lipsey............................... 343/103
3,343,170  9/1967  Maine................................ 343/103

Primary Examiner—Maynard R. Wilbur
Assistant Examiner—Richard E. Berger

[57] ABSTRACT

Apparatus to permit Loran-C navigation using an available Loran receiver and a commercial programmable desk-top calculator. A navigator is provided with heading angle, relative position information, velocity information and a real-time plot of ship's position on standard navigation charts. An interface unit adjusts signal levels for system compatability and stores incoming data in preparation for its use by the caluclator. Destination data may be inserted from remote units and navigational information may be displayed remotely, as well.

4 Claims, 7 Drawing Figures

LORAN ASSIST DEVICE

BACKGROUND OF THE INVENTION

Modern Loran-C networks cover much of the world's navigable waterways. Proper use of these radio signals make it possible to determine one's position to within onequarter of a mile accuracy. The Loran-C system operates by broadcasting a series of accurately spaced pulses at a relatively low frequency of 100 KHz. A master station operates in conjunction with at least two slave stations. The slave stations receive the transmission from the master station and, after a short delay, retransmit or re-radiate the signal originally transmitted by the master station. The length of time between transmission of a pulse group by a master and retransmission of that same pulse group by a slave includes the slave time delay and also the finite time required for the signal to traverse the distance between the master and slave. Since the signals transmitter by the master and slaves are all propagated through the atmosphere at the same rate, any time difference occuring between reception of these signals will represent the difference in path lengths travelled by the signals. The Loran receiver then must track three Loran stations simultaneously, a master and two slaves. The difference that is measured in the time-of-arrival between the master and the first slave station is called Time Difference A (TDA), and serves to establish one hyperbolic shaped Line of Position (LOP). Time Difference B (TDB) obtained from the master and second slave station, serves to establish a second Line of Position. A manually calculated solution to determine position using the LOP data is too complex and lengthy to be of practical use, and the navigator must use specially prepared charts or "look-up" tables. Use of these charts, tables, etc. negates much of the speed and accuracy which is inherent in Loran-C position determination. Also, special charts and tables are required for all global areas likely to be visited by the ship. Furthermore, this process does not provide range or bearing angle information necessary to steer the ship to the selected destination.

There are on the market today a number of relatively inexpensive, programmable calculators of rather small size. These calculators have only recently become available due to advances in integrated circuit fabrication techniques. These calculators would be of great use to the Loran-C navigator were he able to supply the calculator with the necessary input information within a reasonable length of time. Also available today are receivers specifically designed for Loran-C; these receivers provide the navigator with the requisite navigation information. That is, the receiver will not only receive the signals transmitted by a specific Loran-C master/slave network or chain but will also provide information as to the spacing or timing of the signals. Hence, the modern navigator who desires to use the Loran-C network has available to him a receiver which will supply the navigation parameters as well as a calculator on which to perform the necessary navigation computations.

SUMMARY OF THE INVENTION

It is therefore an object of the present invention to provide apparatus to enable Loran-C navigation to be accomplished using a commercially available receiver and a programmable calculator.

It is another object of the present invention to provide an interface and signal processor to operate in conjunction with a commercial Loran-C receiver and commercial programmable calculator.

It is a further object of the present invention to provide a Loran-C navigator with heading angle, relative position information, velocity information and a real-time plot of a ship's position on standard navigation charts.

It is still a further object of the present invention to provide a system to facilitate the use of the awkward hyperbolic grid system used in Loran-C navigation.

It is an object of the present invention to allow the use of a commercially available programmable calculator to perform the necessary navigation computations. It is not, however, an object of the present invention to teach new methods of programming such calculator to perform these computations. The Loran-C navigation calculations are well-known and need not be further explained. Similarly, most programmable calculators are supplied with sufficient instructions to allow a program to be implemented to solve the Loran-C equations. So too the standard Loran-C receiver will not be elaborated upon.

The present invention consists of four major subsections functionally denoted as the receiver interface, the processor, the calculator interface and the display logic. The receiver interface section accepts tracking strobes or timing pulses from the Loran-C receiver. A precision oscillator in the interface section is used to measure the time delay (TD) between the master station tracking strobe and the first slave station (A). Upon the occurrence of the next set of tracking stobes the time delay (TD) between the master station and the second slave station (B) is measured. It should be noted that the rate at which these tracking strobes become available depends upon the particular pulse recurrence rate (prr) of the Loran chain being used. Each chain, consisting of one master and from two to six slaves, has its own individual pulse recurrence rate or frequency; this then becomes that chain's signature. The "prr" the Eastern Coast of the United States (chain SS7) is slightly less than 0.1 second. It can then be seen that, when using this particular chain, the receiver interface can determine about five new position data points (time delay A and time delay B) per second.

The processor section serves to smooth the time delay measurements, i.e., it maintains a running average; it then stores this information until it is ready for use by the programmable calculator. The rate at which the time delay measurements (TDA and TDB) are changing is also sensed by the processor. This information, denoted as TDA and TDB, will then be used by the calculator to compute the ship's velocity. The processor also has an initialization capability which clears and resets the storage registers in the processor.

The calculator interface section accepts and decodes requests from the calculator for data transfers. Data requisite for computing position and velocity are transferred from the processor by the interface to the calculator. Conversely, data to be displayed are transferred from the calculator by the interface to a display logic system.

The display logic system stores data to be displayed and also provides appropriate signals to control display devices such as digital display registers or analog meters. A digital display is used to indicate the range and bearing determined by the calculator. Analog meters are used to display along-track-distance and cross-over-error. A convenient configuration for such meters is to use two orthogonal needles contained within one meter face. In shipboard use it is convenient to have these display devices located in the helm rather than in the navigation room. It is useful to employ a remote data unit for inputting destination data and desired course heading, such remote data unit would also be most conveniently located in the helm. A paper tape printer and an X-Y plotter are useful in displaying navigation data computed by the calculator.

DESCRIPTION OF THE PREFERRED EMBODIMENT

Figure 1:
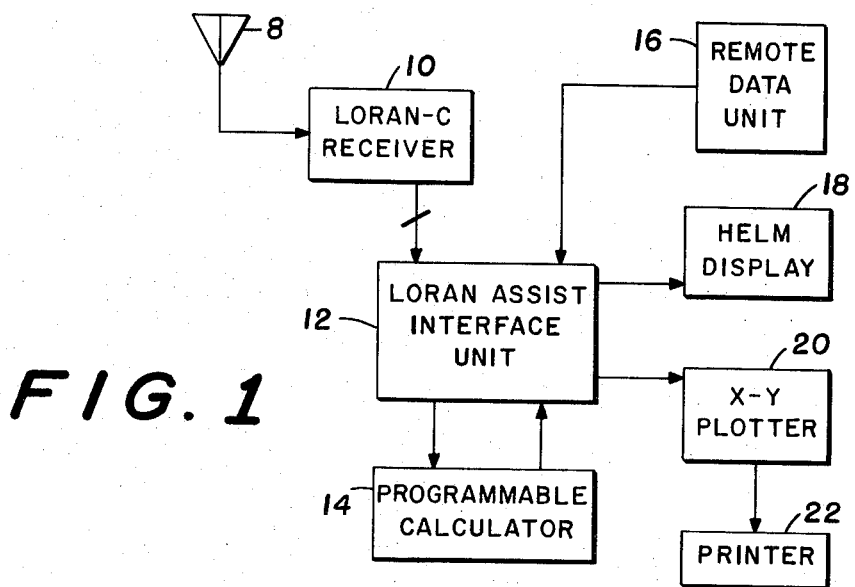
FIG. 1 is a block diagram showing a Loran-C navigation system employing the present invention.

Referring now to Fig. 1, the present invention is shown in its intended environment. As mentioned earlier Loran-C signals are received by use of a conventional antenna 8, and commercially available Loran-C receiver 10.Timing pulses or tracking strobes containing the desired position information are fed to a Loran Assist Interface Unit 12 which constitutes the subject invention. The interface unit 12 is connected to a conventional, commercially available, programmable calculator 14, which performs the mathematical calculations required to navigate using Loran-C. A remote data unit 16 may be used to insert the coordinated of the desired destination into the system. A helm display unit 18, an X-Y plotter 20, and a paper tap printer 22 are shown connected to the interface unit 12. These units display the navigation information which has been computed by the programmable calculator 14. This figure illutrates the position in a typical Loran-C navigation system occupied by the Loran Assist Interface unit 12 which is an embodiment of the present invention.

Figure 2:
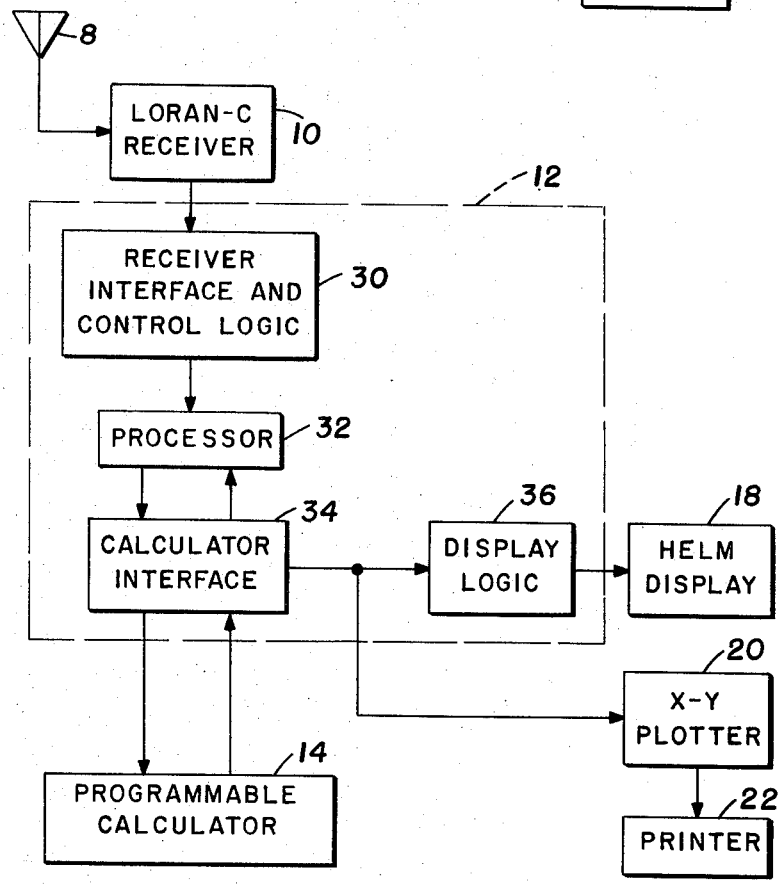
FIG. 2 is a block diagram showing the interface unit of the present invention in greater detail.

Referring to Fig. 2, the system of Fig. 1 is shown in further detail. The Loran Assist Interface Unit (12 in Fig. 1) consists of four functional subsystem modules; specifically, a receiver interface and control logic unit 30 receives timing pulses from the receiver 10 and buffers the signals for use by a processor unit 32. The filtered Loran-C time differences are then stored in some predetermined order until called for by the programmable calculator 14. Information to and from the programmable calculator 14 is handled by a calculator interface unit 34, which provides the necessary buffering and synchronization of pulses to enable data transfer. The results of the calculations are transferred from the calculator 14 by the calculator interface unit 34 to a display logic unit 36 which performs the required sotrage, buffering, and timing control necessary to display the navigation data on the helm display 18. The X-Y plotter 20 and paper tape printer 22 are also controlled by the calculator interface unit 34.

Figure 3:
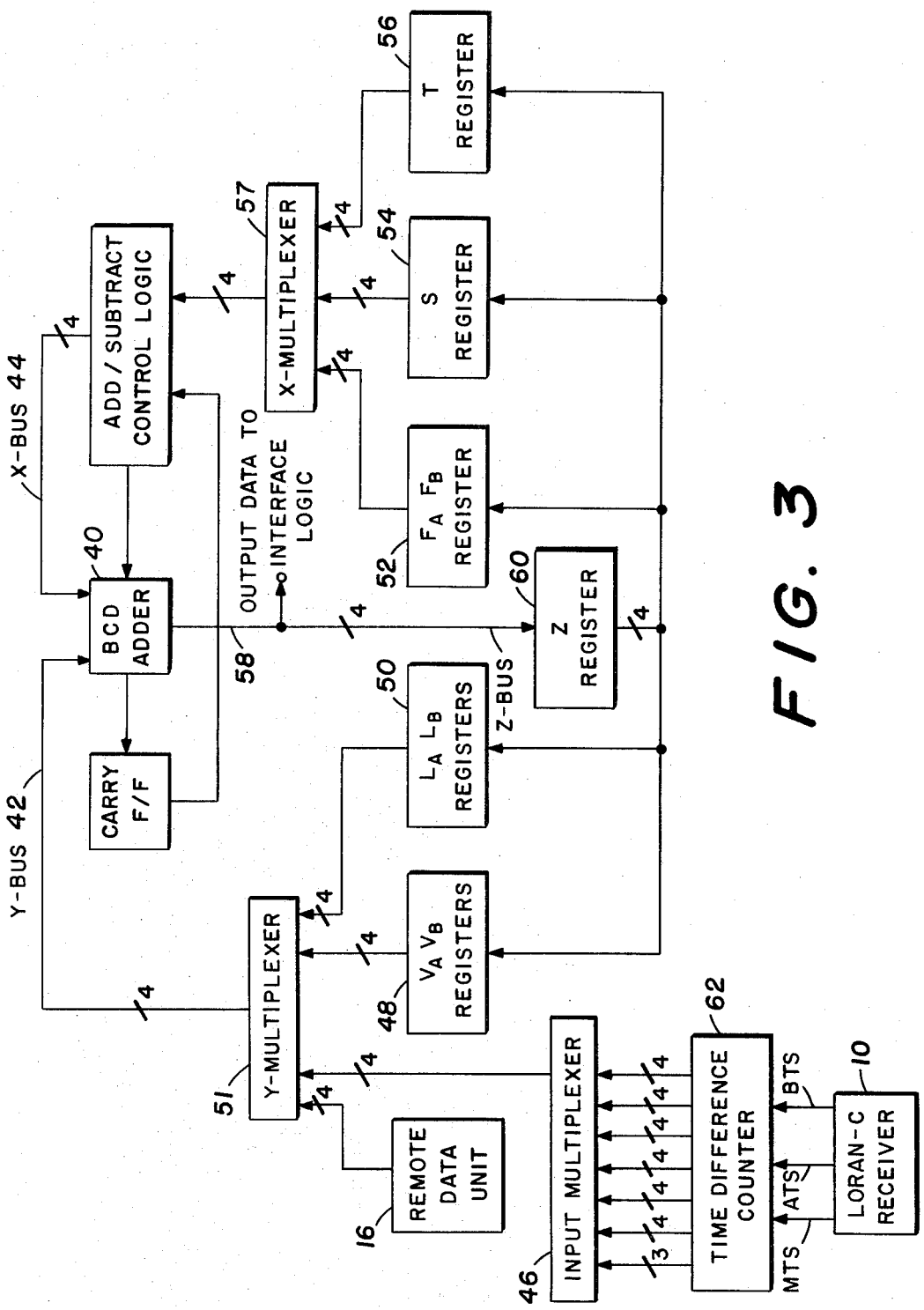
FIG. 3 is a block diagram showing the data flow of the processor subsection of the present invention. Blocks are used both to show apparatus, e.g., registers, and functions performed, e.g., multiplexing; multiple data paths as shown by a slashed single line and a numeral indicating the actual number of electrical lines. Apparatus and electrical connections necessary to control data flow are not included, but are shown in the following figure.

Attention is now turned to Fig. 3 which shows the data flow in the Loran Assist Interface processor (32 in Fig. 2). Apparatus and electrical connections for controlling this data flow are not shown here but are shown in the following figure. The processor accepts input signals which contain the Loran-C time differences (TDA and TDB) and which have been passed through a receiver interface unit where they were buffered. The processor filters TDA and TDB in real time and provides the calculator (14 in Fig. 2) with smoothed TDA and TDB, and an estimate of the rate of change of TDA and TDB (TDA and TDB). The central, most important item in the processor is a Binary Coded Decimal Adder 40, which adds the contents of a Y bus 42 and X bus 44. The Y bus 42 can be driven by the remote data unit 16, an input multiplexer 46, a V storage register 48, or an L storage register 50. A Y multiplexer 51 may consist of a plurality of terminals for connecting together these several units driving the Y bus 42. The X bus 44 may be driven by an F storage register 52, an S storage register 54 or a T storage register 56. A X multiplexer 57 may similarly consist of a plurality of terminals for connecting the various driving units to the X bus 44. Output data from the processor may be taken from the output line 58 of the BCD adder 40. This output line 58, called a Z bus, is clocked into a Z register 59 for distribution into one of the various storage registers 48, 50, 52, 54, 56 to be transferred to the calculator when required. The input multiplexer 46 provides the Y bus 42 with time difference information obtained from a time difference counter 62 of a conventional type. The time difference counter 62 is controlled by tracking strobes or timing pulses from the Loran-C receiver 10, these strobes are the master tracking strobe MTS, the A tracking strobe ATS, and the B tracking strobe BTS. The functions of the various storage registers will be explained in further detail hereinafter, however, they serve mainly to store timing data until the calculator is ready to utilize the data in a calculation.

Figure 4:
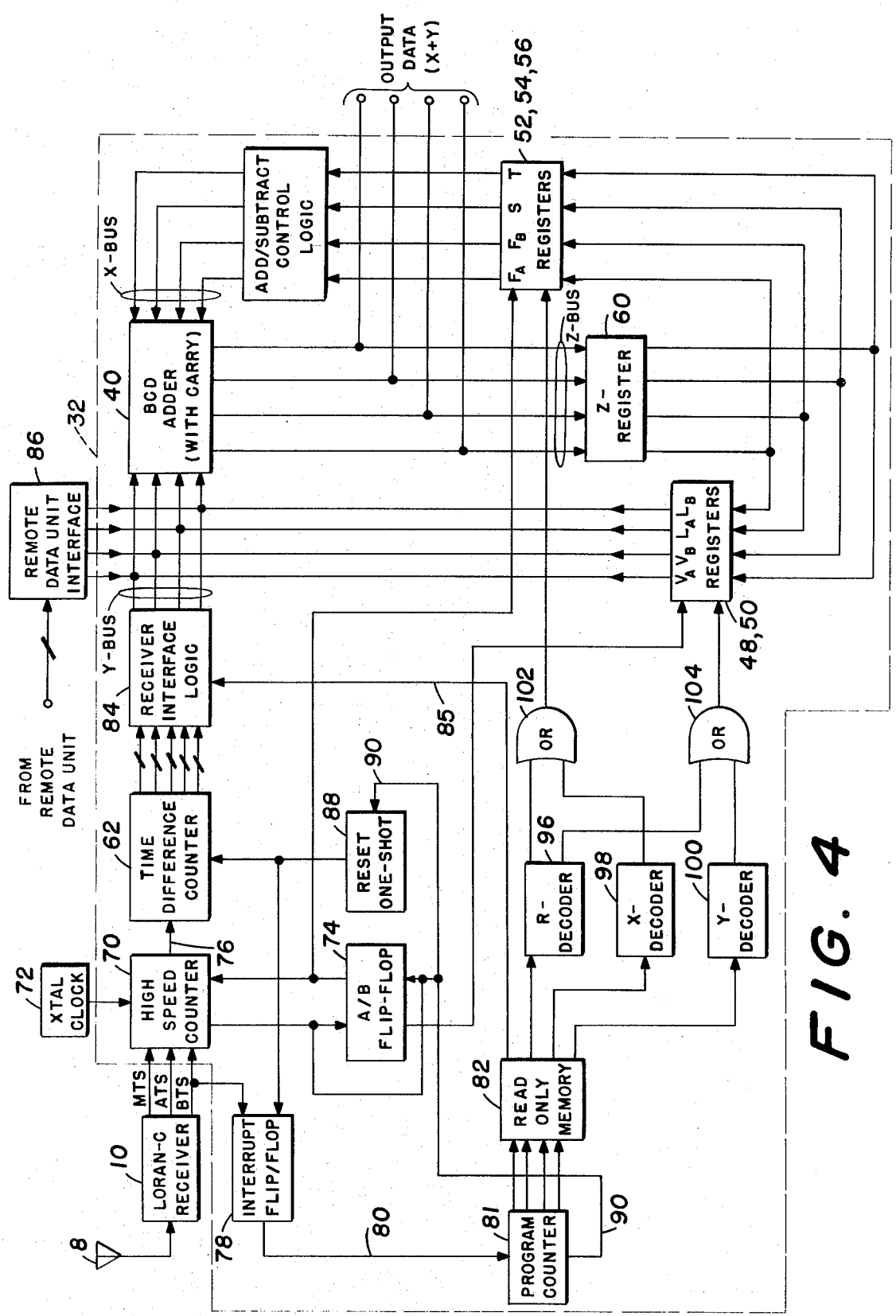
FIG. 4 is a block diagram of the processor subsection of the present ivention, including all control apparatus and interconnections required for operation.

Referring now to Fig. 4 which shows a block diagram of the processor (32 of Fig. 2) showing apparatus and connections necessary to implement the data flow of Fig. 3. A high speed counter 70 presents the first BCD digit of time difference information to be measured by the time difference counter 62, the high speed counter 70 generates the BCD time difference information from the tracking strobes MTS, ATS, BTS, obtained by the Loran-C receiver 10. The high speed counter 70 utilizes 50 MHz clock pulses generated by a precision crystal oscillator 72. The high speed counter 70 will be started by the master tracking strobe MTS and stopped by either the A tracking strobe ATS or the B tracking strobe BTS, depending upon the state of an A/B flip-flop 74. The output signal 76 of the high speed counter 70 is used to clock the time difference counter 62. When the B tracking strobe arrives, an interrupt flip-flop 78 generates an interrupt signal 80, which commands the processor to begin. This signal 80 starts the program counter 81, the output signals of which are fed to a read only memory 82, which contains a hard-wired processing program for filtering the Loran-C time differences. The time difference information which is produced by the time difference counter 62 is multiplexed by a receiver interface logic module 84 so that the time difference information from the time difference counter 62 appears on the Y bus at the appropriate time. The receiver interface logic unit 84 is enabled or controlled by a section of the read only memory 82 via a signal on line 85. A remote data unit interface 86 merely consists of OR logic circuits which serve to insert data from the remote data unit, 16 in Fig. 1, onto the Y bus whenever the processor is not running, thereby allowing the calculator interface unit, 34 of Fig. 2, to imput remote data to the calculator 14. The A/B flip-flop 74 toggles at the end of each processor machine cycle and selects either time difference A or time difference B for the time difference counter 62. The A/B flip-flop 74 also selects either the $V_A$ or the $V_B$ register, the $L_A$ or the $L_B$ register, the $F_A$ or the $F_B$ register, depending on which time difference, TDA or TDB, is being processed. This allows the processor to filter both TDA and TDB in real time using only a one-program read-only memory and only one processor BCD adder. The processor program is executed by the processor once every Group Repetition Interval (GRI) for the East Coast chain this is once every 0.0993 seconds. TDA and TDB are filtered in real time by this program, and estimates of TDA and TDB (the time rates of change of the TDs) are made available to the calculator, 14 of Fig. 1, in addition to the filtered position coordinates.

The equations solved by this program are:

$$F_N + 1 = F_N + V_N \quad (1)$$

$$V_N + 1 = 0.96 \, V_N + 0.0004 \, (TD - F_N + 1) \quad (2)$$

Here F represents the contents of the F register 52 or the filtered time difference output. V represents the contents of the V register 48, or the time rate of change of the time difference. TD is the present time difference from the Loran-C receiver 10. The program consists of 32 instruction words which are stored in a field-programmable read only memory (ROM) 82. The same program is used to filter TDB as is used to filter TDA.

A set of processor instructions may then be written around these thirty-two ROM words utilizing conventional computer programming techniques. Diodes are then physically installed in the ROM 82 in accordance with these instructions. Since the processor does not have a read-write memory, all instructions must be register reference instuctions, these registers are denoted $L_A$, $L_B$, $V_A$, $V_B$, $F_A$, $F_B$, S and T. Since the receiver interface control 84 will automatically provide the datum necessary to determine whether the A or B register should be used, the instruction words need not specify this. For example, when the L register 50 is addressed in the iestructions, the processor will use LA if TDA is the Loran time difference being processed, or it will use $L_B$ if TDB is being processed. Consequently, the instruction mnemonics need only use the following symbols: IN, L, V, F, S and T. The Y bus (IN) will contain either TDA or TDB, whichever is appropriate. It has been found that approximately 180 instructions will successfully provide the register transfer function required by the 32 word program.

A reset one-shot 88 is triggered at the end of each machine cycle by sensing, on line 90, an output signal from the program counter 81. This signal also serves to clear the interrupt flip-flop 78. The BCD adder 40 adds the contents of the X bus to the contents of the Y bus, providng the sum on the Z output bus. Arithmetic is bit-parallel, digit-serial, and it has been found that binary-coded-decimal negative 10's complement notation is very convenient.

The V, L, F, S, T and Z registers 48, 50, 52, 54, 56, 60 and the data buses X, Y and Z control the data flow in the system as was previously explained in the discussion of Fig. 3. Each register is a 16-word by 4-bit read-write bipolar memory; hence, each data word is 16 decimal digits in length.

Operand decoders serve to decode bit groups from the instruction in the read-only memory and to enable the appropriate registers at the appropriate times. More specifically, an R-decoder 96, an X-decoder 98, and a Y-decoder 100 are used to perform this enabling function. These decoders 96, 98 and 100 are connected through conventional OR gates 102 and 104 to the appropriate registers in such a way that the X and Y buses will be enabled when required and also, when the R-decoder is operating, it can select which register 48, 50 or 52, 54, 56 will receive data from the Z bus. Therefore, it can be seen that the processor is a three-address parallel unit. The read-only memory 82 is hard-wired with a diode matrix to perform this instruction selection, and contains a 32-word by 8-bit memory. Each instruction word consists of eight binary bits. The most significant bit determines whether the instruction is to "add" or "subtract." The next two most significant bits determine the operand to appear on the Y bus during a first operating phase of the processor. The next two significant bits determine the operand to appear on the X bus during the first processing phase. The three least significant bits determine the destination register for data on the Z bus during the final processing phase.

Figure 5:
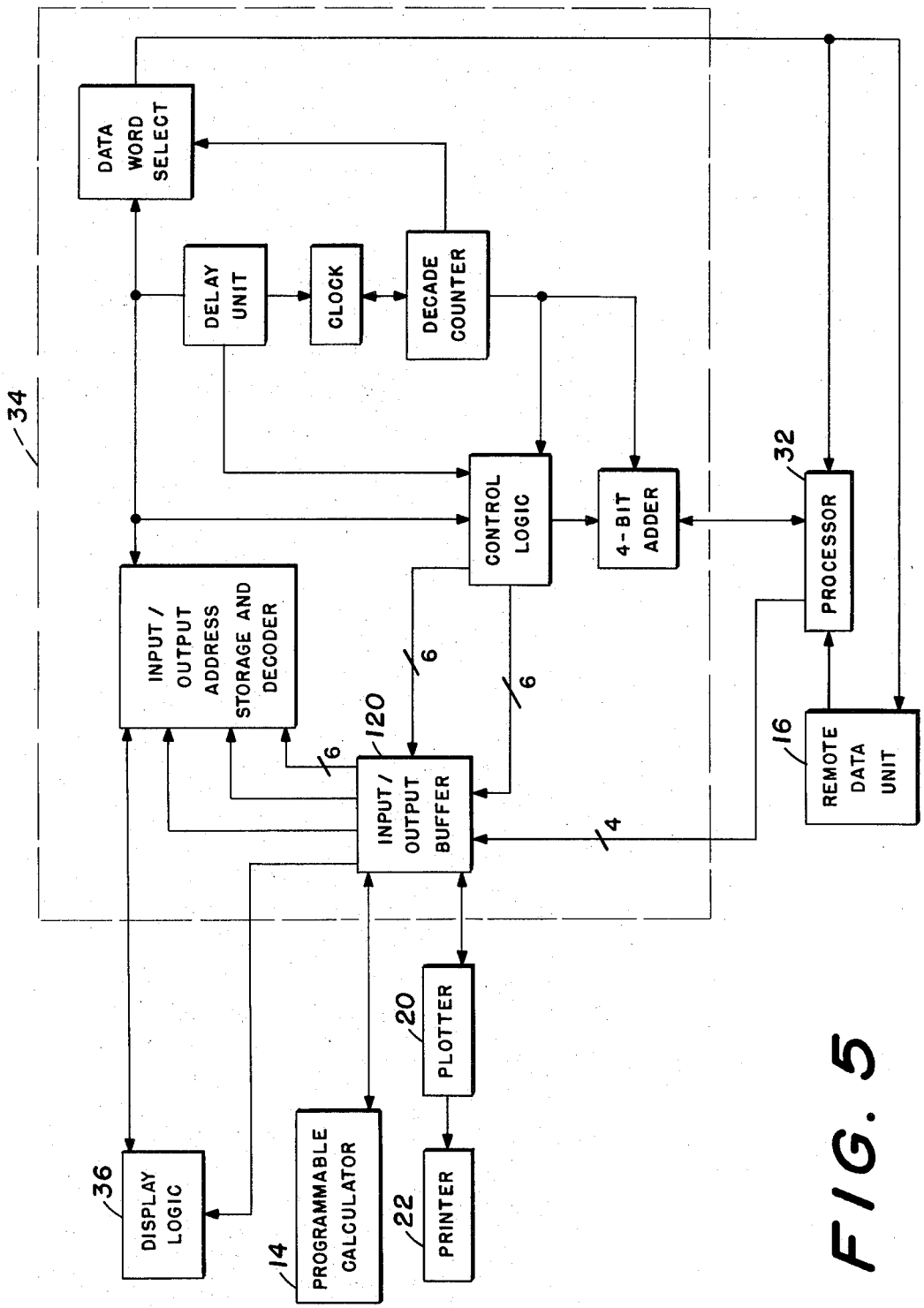
FIG. 5 is a block diagram of the calculator interface subsection of the present invention.

Referring to Fig. 5 the calculator interface unit (34 of Fig. 2) is shown in more detail. The interface 34 is shown interconnected with the other units of the system as in Fig. 2. This interface unit 34 serves to buffer the calculator 14 signals by use of an input/output buffering unit 120. This buffer unit 120 is of a conventional design and performs the functions required of such units, i.e., it adjusts signal levels or logic sense, and performs encoding, decoding, storage, timing and other functions such that the calculator 14, the printer 22, the plotter 20 and the processor 32 electronics are mutually compatible and may communicate with each other.

Figure 6:
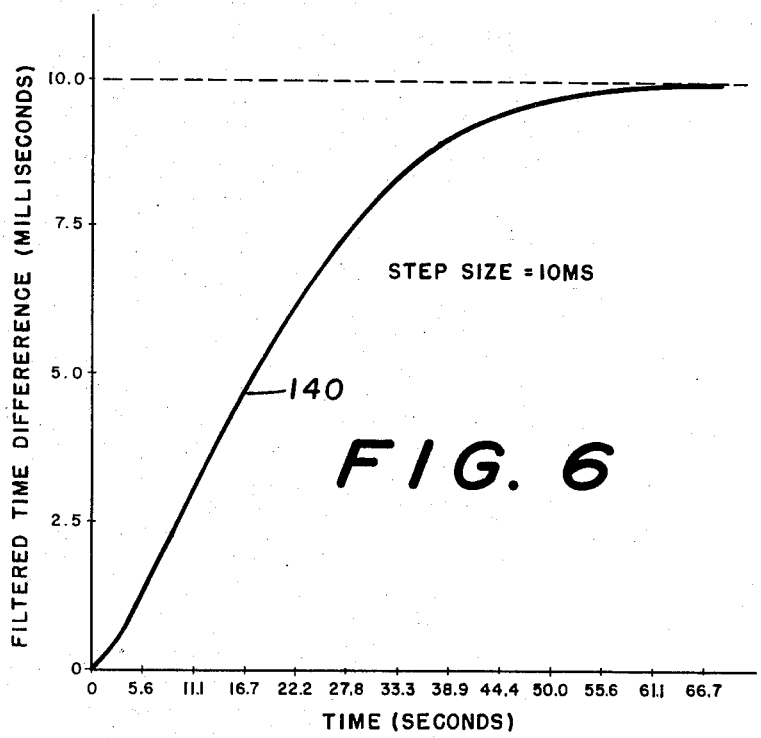
FIG. 6 is a graph of the processor filter position step response.

Referring to Fig. 6, a graph of the processor filter position step response is shown. The equations discussed above, equations (1) and (2), are used by the processor, as previously explained, to filter the Loran-C time difference in real time, preparing them for use by the calculator. The ordinate axis of the graph represents this filtered time difference. The abscissa axis represents time in seconds and the values of the gradations will depend upon the particular Loran-C chain being used. The curve 140 is a plot of the output from the processor filter program as it solves equations (1) and (2) for a step in position equal to 10 milliseconds. As may be seen the response is rather overdamped but it converges to the step displacement in a satisfactory time.

Figure 7:
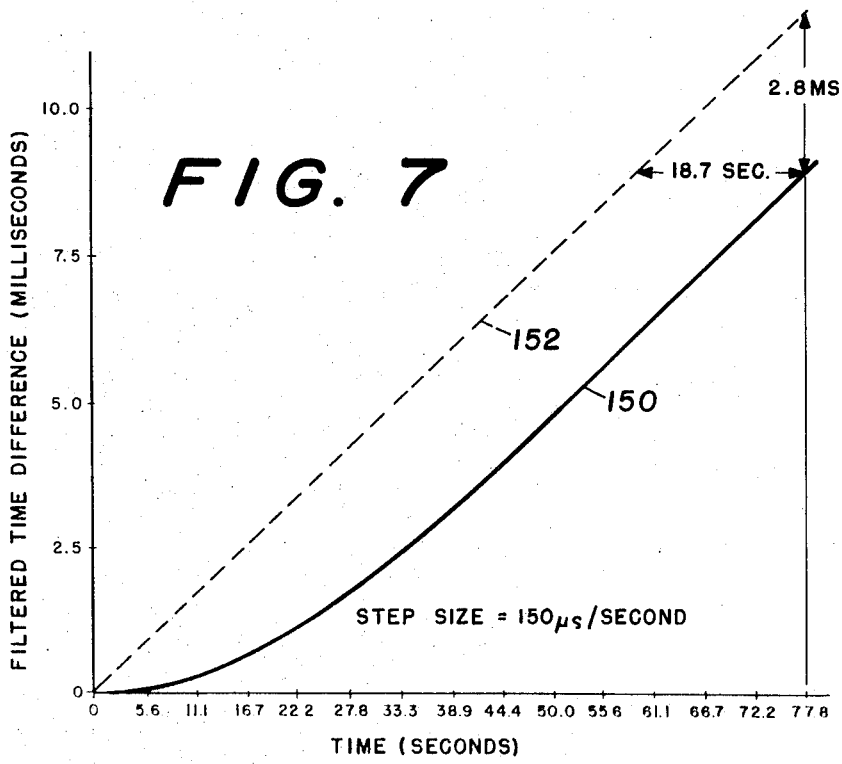
FIG. 7 is a graph of the processor filter velocity step response.

Referring now to Fig. 7, a graph of the processor filter velocity step response is shown. Again equations (1) and (2) are solved with a program designed to produce the velocity step response of the processor filter. The ordinate axis represents the filtered time difference in milliseconds. The abscissa axis is time in seconds and again the values of the gradations dependent upon the particular Loran-C chain in use at that time. The curve 150 is a plot of the output from the processor filter program as equations (1) and (2) are solved for a step in velocity equal to 150 microseconds per second. This output plot 150 exhibits a time lag, after the filter has reached steady state, from the ideal linear velocity step response, shown as the dashed line 152. The filter reaches steady state at about 50 seconds and the time lag is approximately 18.7 seconds, for this particular group repetition interval (GRI). Such time lag has been found to produce satisfactory results.

It should be understood that the details of the foregoing enbodiment are set forth by way of example only. Accordingly, it is contemplated that this invention not be limited by the particular details of the embodiment as shown except as defined in the appended claims.

We claim:

1. In a hyperbolic navigation system including a receiver, for receiving signals transmitted by master and slave stations and for producing therefrom unique tracking strobe signals, and a programmable calculator capable when supplied with filtered time difference measurements of said tracking strobe signals of manipulating said measurements in accordance with predetermined navigation equations to produce navigational data, the improvement comprising an interface means for operably connecting said receiver and said programmable calculator, said interface means comprising:

read-only memory means for storing and outputting data enabling signals according to a predetermined sequence, means responsive to the signals from said memory means and being connected to receive said unique tracking strobe signals from said receiver for producing therefrom a plurality of timing difference signals defining a measure of the time differences between said tracking strobe signals, binary adder means having a first plurality of inputs, a second plurality of inputs, and a plurality of outputs representing the sum of said first and second pluralities of inputs, single register means connected to receive said plurality of output signals from said adder means and producing a plurality of output signals therefrom, a first plurality of shift register means responsive to the signals stored in said memory means, each of said first plurality of shift register means having inputs connected to receive said output signals of said single register means and each having a plurality of outputs connected to said first plurality of inputs of said adder means, and a second plurality of shift register means responsive to the signals stored in said memory means, each of said second plurality of shift register means having imputs connected to receive said output signals of said single register means and each having a plurality of outputs connected to said second plurality of inputs of said adder means, said programmable calculator having data input terminals connected to said plurality of outputs of said adder means.

2. The apparatus of claim 1 wherein said receiver interface means comprises:

oscillator means for generating a pulsed output signal, means connected to receive said oscillator output signal and said unique tracking strobe signals for reproducing groups of pulses of said pulsed output signal upon occurrence of said tracking strobe signal corresponding to said master station and for blocking said pulsed output upon occurrence of one of said tracking strobe signals corresponding to said slave stations, and register means connected to receive said groups of pulses for counting the number of pulses in each successive group of pulses and for producing a coded binary signal representing the difference in number of pulses between each of said successive groups.

3. The apparatus of claim 2 wherein:

said oscillator means is a crystal controlled oscillator, said means connected to receive said oscillator output signal comprises a plurality of flip-flop multivibrators, and said binary adder means is a binary coded decimal full adder.

4. The apparatus of claim 3 wherein:

said predetermined sequence of said enabling signals of said read only memory means is in accordance with the equations:

$$F_N + 1 = F_N + V_N$$

$$V_N + 1 = 0.96 V_N + 0.0004 (TD - F_N + 1)$$

where F represents a filtered time difference output signal from said adder means, V represents the time rate of change of said output signal from said register means, and TD represents said output signal from said register means.

* * * * *